May 21, 1963  W. W. MIEHER  3,090,951
MONOPULSE RADAR SYSTEM
Filed Dec. 20, 1950  5 Sheets-Sheet 1

INVENTOR
WALTER W. MIEHER
BY
Paul B. Hunter
ATTORNEY

United States Patent Office
3,090,951
Patented May 21, 1963

3,090,951
MONOPULSE RADAR SYSTEM
Walter W. Mieher, Mineola, N.Y., assignor to Sperry Rand Corporation, a corporation of Delaware
Filed Dec. 20, 1950, Ser. No. 201,780
14 Claims. (Cl. 343—16)

This invention relates to simultaneous lobing radar systems and more particularly to means for improving the angular and range accuracy of said radar systems.

It has long been recognized that the best angular accuracy for a radar system may be obtained by comparing overlapping receptivity patterns or lobes. The first double lobe systems had non-simultaneous, sequential, comparison and suffered inaccuracy because of changes in amplitude caused by glint, fading or system gain, which occurred between the taking of samples by the respective lobes. Glint is an extremely short reflection of energy, similar to sunshine flashes from a windshield. For example, if the overlapping lobes are created by the mechanical oscillation of an antenna, the time interval between the taking of the up and down lobe samples is quite large compared with radar time interval measurements.

The answer to this difficulty is the simultaneous lobing or monopulse system, that is, a system taking the up and down or left and right samples at the same time. However, this simultaneous sampling procedure creates a new problem, namely, the instantaneous identification and comparison of the received lobes. If parallel receiver channels are used, the gains of the channels must be continuously and automatically balanced to avoid any differential amplification since the pointing and ranging system depends upon amplitude comparison.

Therefore, there is a need for a system of the simultaneous lobing, or monopulse, type which is able to compare the separately received lobes in amplitude without the necessity for parallel receiver channels, thereby avoiding the possibility of differential amplification. This will greatly improve angular accuracy and therefore range accuracy. Angular accuracy is particularly hard to achieve in air-to-ground ranging due to higher ratio of ground clutter returned. Furthermore, an angular error in the vertical plane causes a relatively large error in slant range, especially at normal low glide angles. Therefore anything which improves angular accuracy, will improve ranging to an even greater degree.

The present invention comprises a simultaneous lobing radar system in which two overlapping lobes are received. The amplitudes of the parallel lobes are simultaneously compared in the following manner. The two signals are combined so as to obtain sum and difference quantities. When these sum and difference quantities are plotted out in graph form, it will be shown that when the system antenna is accurately pointed both lobes will have equal amplitude and hence the difference quantity would be zero. As the angular deviation increases in one direction, the difference quantity is in phase with the sum quantity, and when the deviation increases in the other sense, the difference quantity will be 180° out of phase. Note that there is a sharp reversal of polarity depending on the sense of the angular deviation. Therefore if the sum quantity is used as a reference, and the sum and difference quantities are compared in phase, a very sharp measurement of angular deviation may be obtained. This phase measurement is a measure of the amplitude comparison between the two lobes and therefore of the angular resolution of the system.

This method of comparison of the lobes is continuous and simultaneous and avoids the use of separate receiver channels and therefore avoids the possibility of differential amplification.

Air-to-ground ranging is an important use of the radar of this invention. In this system, which uses the principle of simultaneous lobing, the antenna has two feeds to produce overlapping radio beams. During the transmitted pulse, these feeds are energized equally, producing a single beam to illuminate the target. In reception, the relative intensity of received energy at each feed depends on the position of the target relative to the cross-over plane of the beams. The two received echoes are then fed into a hybrid microwave junction, the outputs of which are two new signals proportional to the sum and difference of the original signals. These sum and difference R-F signals are converted to I-F signals, and amplified.

The outputs of the sum and difference I-F amplifiers are then applied to a phase sensitive detector. This phase detector produces a video signal proportional in amplitude to the difference signal, and with a polarity indicative of the phase relationship of the difference I-F signal to that of the sum I-F signal, the latter taken as a standard reference.

The sum I-F signal alone may also be applied directly to an amplitude detector to produce a sum video signal. The sum and difference video signals are then amplified, and the final output of the receiver circuits is a sum signal which is a wide, positive signal, and a difference signal which is a signal positive for targets nearer in range than the crossover plane, and negative for targets more remote than the crossover plane. These sum and difference signals may then be applied to suitable range circuits.

Figures 2, 7:
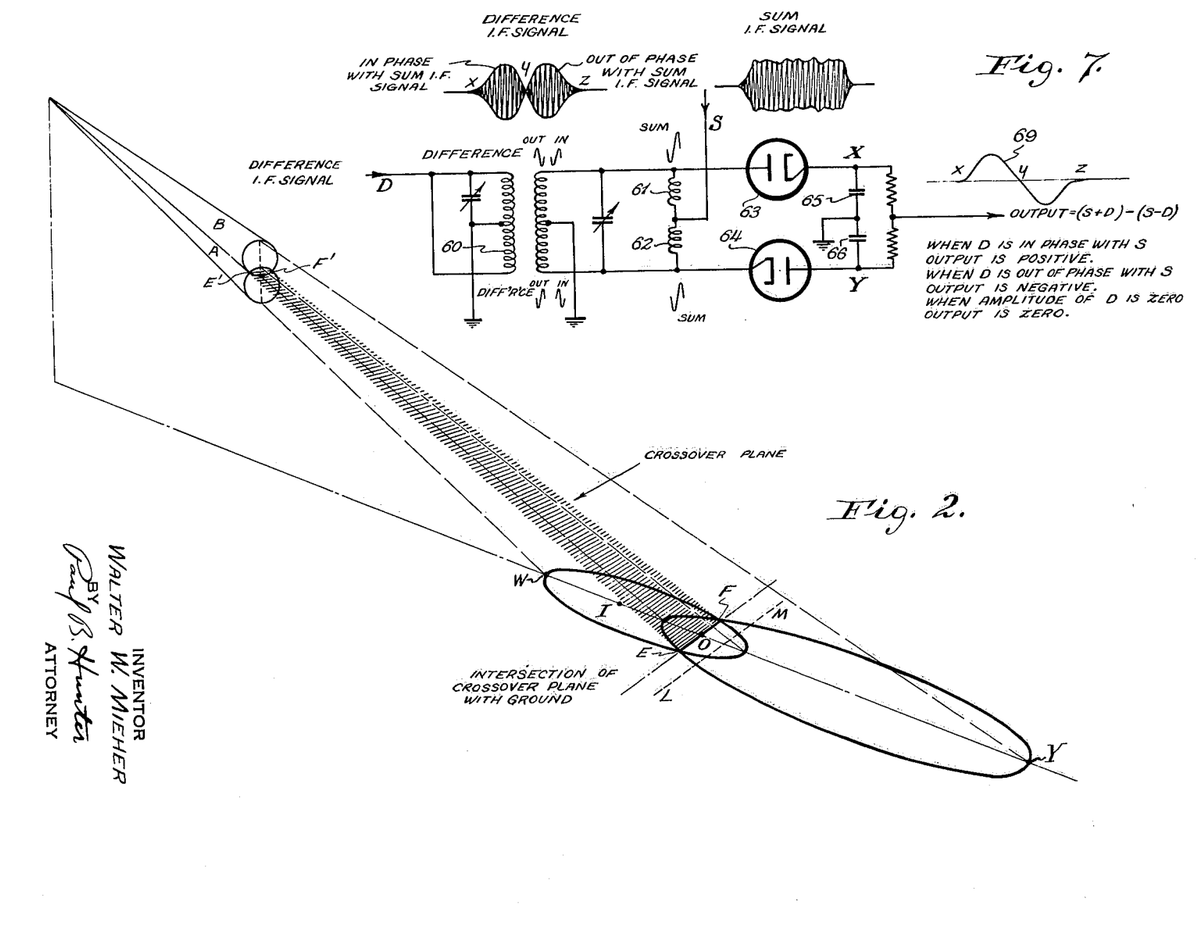
FIG. 2 is a drawing illustrative of the operation of the invention.
FIG. 7 is a schematic diagram of a phase detector used in an embodiment of the invention.

To achieve range accuracies of the order desired in the case of air-to-ground ranging applications, a high-degree of angular discrimination will be required as illustrated in FIG. 2. For small glide angles of the attacking airplane, the apparent angular separation between the target in the line-of-sight and other nearby radar reflectors is very small even though they may be separated a considerable distance in range.

For example, with a glide angle of 10 degrees and a range of 2000 yards, a range error of 106 yards will result from an uncertainty of only ½ degree between measured radar targets and the line-of-sight along which accurate range is desired. For a glide angle of 5 degrees, the range error becomes about 223 yards under similar conditions. It is apparent that the angular resolving power of an air-to-ground ranging system should be in the vicinity of 1 mil. It is almost impossible to achieve such high orders of angular accuracy with conventional radar techniques, particularly under the rapidly changing conditions encountered in air-to-ground situations.

The general solution proposed here to the problems outlined above is to adapt simultaneous lobe comparison or "monopulse" techniques to the solution of this problem.

Accordingly, a principal object of the present invention is to provide a simultaneous lobing radar system having means to compare a plurality of received lobes.

Another object of the present invention is to provide a system of the simultaneous lobing type which is able to compare the separately received lobes in amplitude without differential amplification effects.

Another object of the present invention is to provide a system having means to mix two or more received signals to obtain a new signal which is a measure of their relative amplitudes.

Another object of the present invention is to provide a simultaneous lobing system having means to obtain sum and difference quantities from the received lobes and means to compare the sum and difference quantities in phase.

Another object of the invention is to provide an improved air-to-ground ranging system.

Another object of the invention is to provide noise discriminating means to minimize ground clutter and thereby improve angular and ranging accuracy.

Another object of the invention is to provide means for comparing alternating voltage signals in amplitude including means for obtaining the difference quantity from said signals and means for determining the polarity of the difference quantity to identify which of the signals is greater.

Another object of the invention is to provide means for comparing a plurality of alternating, in phase signals with respect to amplitude, including means for obtaining the difference quantities between said signals, means for obtaining the phase reference voltage in phase with said signals and means for comparing the difference quantities in phase with said reference quantity to determine the polarity of the difference quantity. The purpose of this last step is to resolve the ambiguity as to which signal is greater.

These and other objects of the invention will be apparent in the following specification and drawings of which.

Figures 1, 3:
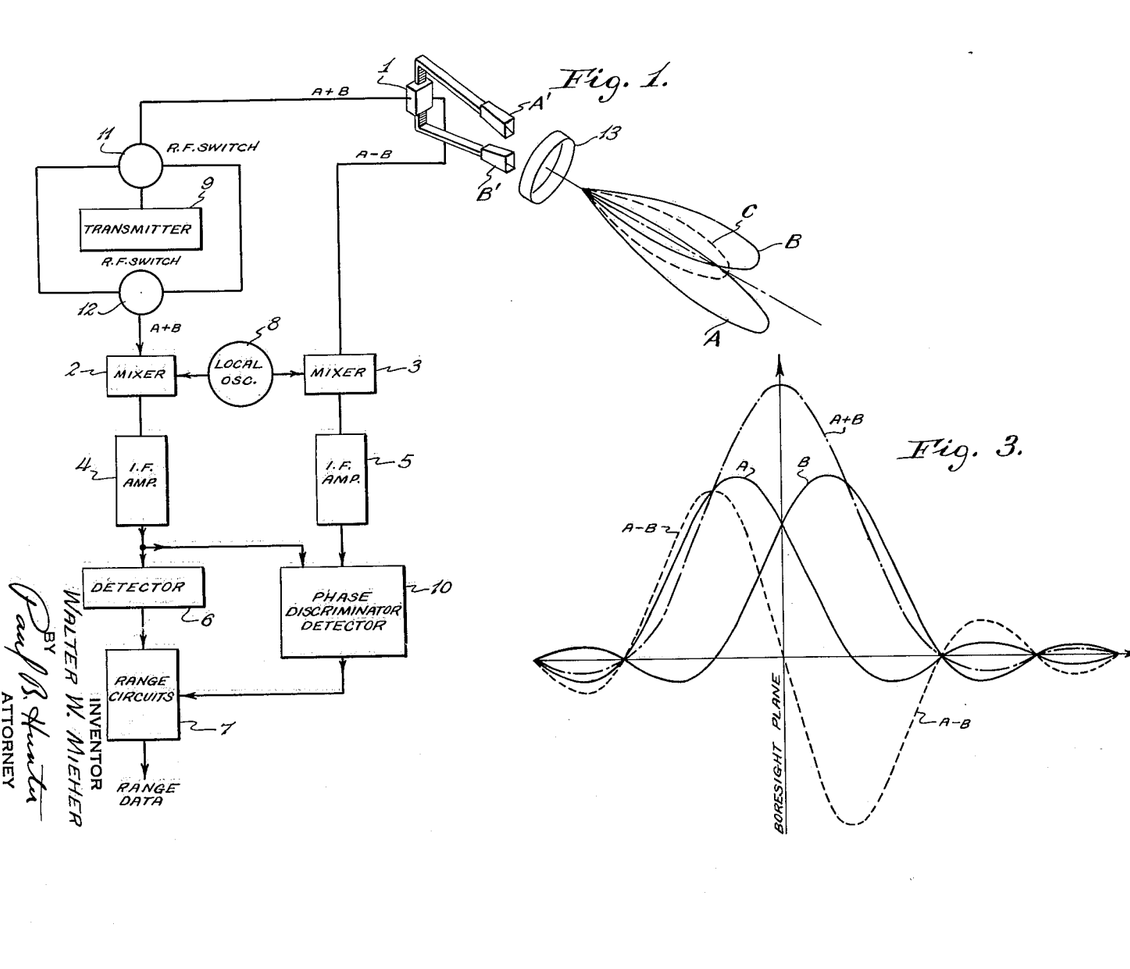
FIG. 1 is a schematic block diagram of an embodiment of the invention.
FIG. 3 is a group of wave forms illustrative of the operation of the invention.

FIGURE 1 shows an embodiment of the invention. The technique is essentially that of radio direction-finding during each individual pulse and uses no mechanical scanning function in the antenna. The antenna lens 13 has two horn feeds A' and B' in the vertical plane which produce fixed overlapping radio receptivity beams A and B. However, during the transmitted pulse from transmitter 9 these two feeds are energized equally to produce a single beam C, to illuminate the target. The echoes are received by the two feeds A' and B' and the relative intensity depends on the position of the target relative to the crossover line of the two beams. If the target is at point O as shown in FIGURE 2, the received echoes will be equal, and if the target is at point Y, the echo received by feed B' will be larger than that received by A'.

These two received echoes are then connected to a microwave magic-tee or "rat-race" hybrid junction 1. The outputs of this waveguide device are two new signals which are proportional to the sum $(A+B)$ and the difference $(A-B)$ of the beams as will be explained. These two signals are then heterodyned in mixers 2 and 3 with signal from local oscillator 8 and amplified in amplifiers 4 and 5. The sum signal $(A+B)$ is detected by detector 6 used as an input to the range circuits 7.

The difference signal is compared in phase with the sum signal as a reference, in phase detector 10. The polarity of the phase detector output determines the polarity of the angular error. The difference signal $(A-B)$, in both phase and amplitude, determines whether the echo is from a target which is located along the line-of-sight. If the target is in the vicinity of point Y, FIG. 2, the range indication must be decreased in range and if the target is in the vicinity of point W, the range indication must be increased. A target located along the line-of-sight will produce equal signals. Hence, there will be no difference signal and the range circuits 7 will measure this echo. Therefore, when the line-of-sight is directed towards the ground, the range circuits will tend to follow the intersection of the line-of-sight and the ground. The range circuits 7 may be conventional pulse ranging arrangements. Switches 11 and 12 represent microwave switching arrangements which will be discussed in detail later.

The use of the simultaneous lobing technique offers the possibility of achieving greater angular discrimination for the same beamwidth than any of the sequential scanning methods and hence greater accuracy is obtained in the range data.

One of the limits on the accuracy of the range data is the length of the line EF, FIGURE 2, which is the intersection of the equal signal plane of the overlapping beams with the ground. The points along this line are all not at the same range, since points of equal range lie along a circle tangent to this line and centered on the ground below the antenna. Therefore it is important to keep the radar beam as narrow as possible so that only a short length of this line is illuminated. The system applications require that the antenna dimensions be kept as small as possible and, therefore, that the shortest possible operating wavelength be employed. The shaded plane defined by the lines EF and E'F' is the crossover or boresight plane.

The patterns obtained from the two feeds, A and B, of a uniformly illuminated parabola are shown in FIGURE 3, together with the sum and difference signals, as a function of the displacement from the boresight plane. If A is greater than B, then $(A-B)$ is positive, and vice versa. This is determined by comparing $A-B$ with a reference, namely $A+B$. It will be seen that one one side of the boresight plane, $A+B$ and $A-B$ are in phase, while on the other side they are out of phase. The output of the phase discriminator detector 10 will be positive when $A+B$ and $A-B$ are in phase, and negative when they are out of phase. FIGURE 3 shows then that under the assumed conditions, the phase detector 10 will have one polarity of output from targets below the boresight, and the other polarity from targets above the boresight.

Figure 4:
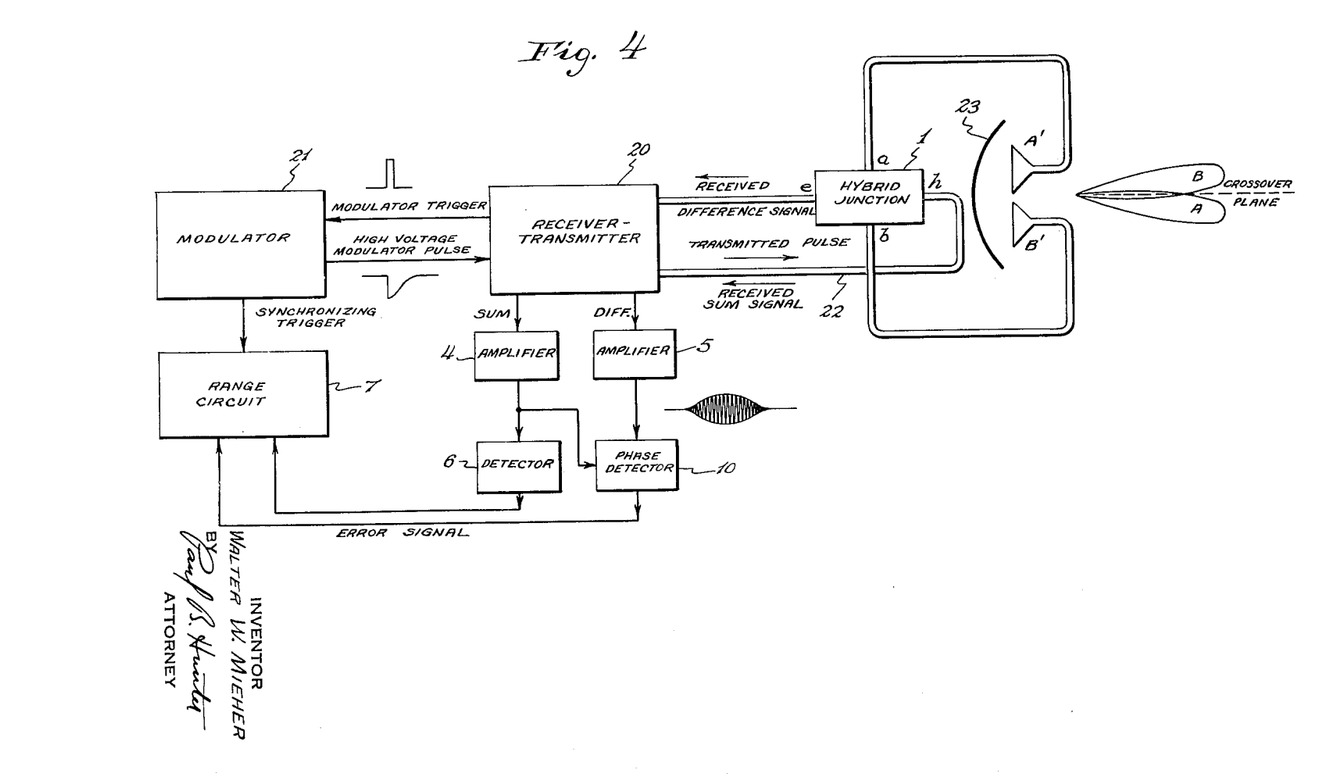
FIG. 4 is a schematic block diagram of an embodiment of the invention.

FIGURE 4 shows one embodiment of the invention in which receiver-transmitter 20 generates a continuous series of trigger pulses at a rate of 4000 p.p.s. for instance by a free-running blocking oscillator. These triggers are applied to the modulator 21 which produces the high-voltage pulses for operation of a magnetron (not shown) in the receiver-transmitter.

The output of the magnetron is a series of short pulses which are applied to the shunt arm $h$ of the hybrid junction 1 by the waveguide 22. The junction 1 may be a well-known waveguide magic-tee or a hybrid circle such as shown by Moreno "Microwave Transmission Design Data," McGraw-Hill, 1948, p. 179. Several of these waveguide junctions are used in the present system. The input to the junction 1 is coupled equally into the two symmetrical arms $a$ and $b$. No R-F energy is coupled into the series arm $e$ of the junction 1. This is the normal function of the magic-tee connection and is well-known. The R-F outputs at arms $a$ and $b$ are applied to horns A' and B' in front of the parabolic reflector 23 through waveguides of equal electrical length. Since the outputs at arms $a$ and $b$ in the hybrid junction are in phase, the horns are consequently driven in phase. Horn A' produces a circular cross-section beam having its axis below the axis of the parabola, and horn B' produces a like beam above the axis. The pattern which illuminates the target is the sum of the two lobes A and B, since the horns are fed in phase. During reception of reflected signals the two beams must be considered separately.

Since the two antenna horns A' and B' are located in the vertical plane, the intersection of the two lobes will define a plane which is horizontal when the aircraft for instance is flying level. This plane, which will hereafter be called the crossover plane, contains the axis of the parabolic reflector 23.

Assume now that an aircraft carrying the equipment is placed in a diving attitude of a few degrees. Since the parabolic reflector is rigidly attached to the nose of aircraft, the beams will be directed toward the earth and the cross-over plane will intersect the earth as shown by line EOF in FIGURE 2. The slant range to points in the vicinity of W is less than those ranges to points in the vicinity of Y, consequently, the ground return signals to the antenna will be distributed over a wide time interval. Furthermore, all points on the ground that lie in a line approximately parallel to EF are at the same slant range from the antenna.

Consider now point I in a line on the ground parallel to EF. This point is closer to the center of beam A than it is to the center of beam B. The ground return signal from this point therefore produces a larger signal in horn A′ than in horn B′. Since all points on the line containing point I are at the same slant range, the signals returned from points on this line will arrive at the horns concurrently. The signals at the horns are thus the integration of the signals from all points on this line, and the amplitude of the signal at horn A′ is still larger than the signal at horn B′. It should be remembered that since the signals reflected to the horns at any instant are from the same ground source, these signals, at the two horns, are always substantially in phase regardless of the relative amplitude.

Reflections from the points in the line EF, the line contained in the crossover plane, produce signals of equal strength in the horns. Ground return signals from lines lying above the crossover plane, such as line LM, produce larger amplitude signals in horn B than in horn A.

In brief, the instantaneous amplitude of the signal in horn A is either greater than, equal to, or less than the amplitude of the signal in horn B, depending on whether the reflected signals are originating below, in, or above the crossover plane.

As shown in FIGURE 4, the signals received at the horns arrive at the symmetrical arms, *a* and *b*, of the hybrid junction. Since the signals are received in phase and the electrical lengths of the two waveguide paths are equal, the inputs to the hybrid junction 1 are in phase. One property of the junction 1 is that the amplitude of the R-F signal obtained at the shunt arm *h* is proportional to the in phase sum of the two inputs to symmetrical arms *a* and *b*; a second property is that the amplitude of the R-F signal at series arm *e* is proportional to the out of phase difference between the signals applied to arms *a* and *b*.

Figure 5:
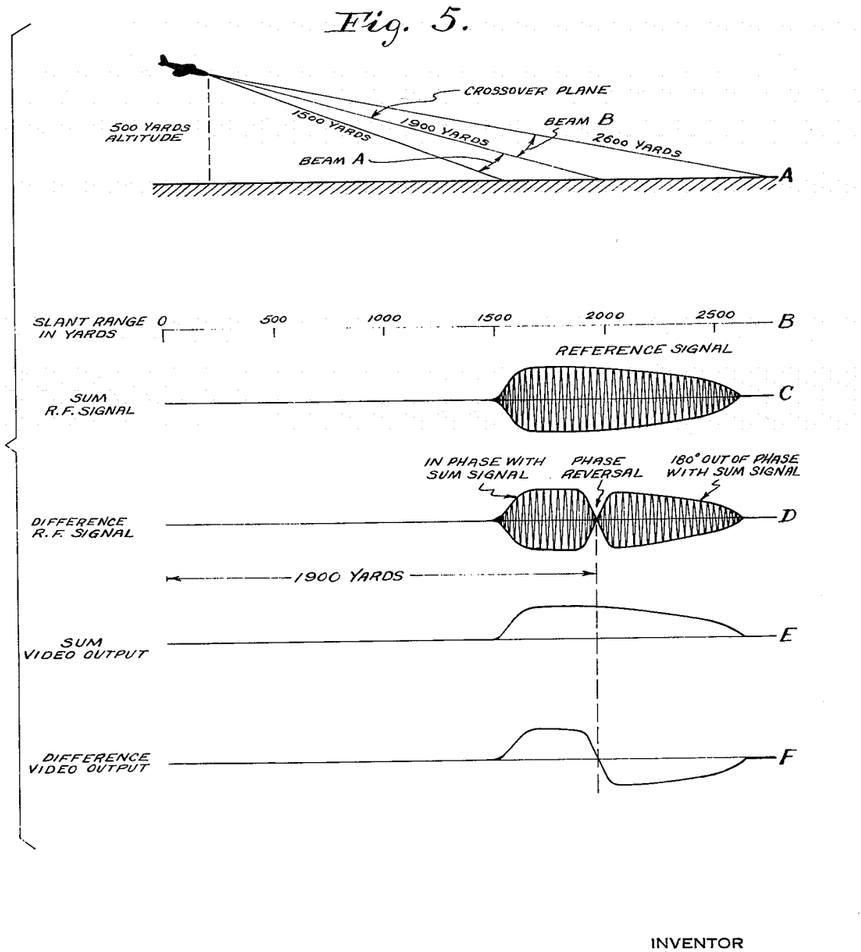
FIG. 5 is a diagram and a group of wave forms illustrative of the invention.

FIG. 5 illustrates the physical relation of the beams from the aircraft to the ground and their relation to the various signals in the system. FIG. 5A shows an aircraft containing the radar system and the relations of the beam A and beam B with the ground. FIG. 5B is a range scale. FIG. 5C shows the sum R-F reference signals, FIG. 5D shows the difference R-F signals and FIGS. 5E and 5F show the sum and difference video signals respectively.

The phase of the R-F component in the differene signal with respect to the corresponding R-F component in the sum signal depends on which horn is receiving the greater signal. If, at any instant, horn A′ is receiving a greater signal than horn B′, the difference signal FIG. 5D will be in phase with the sum signal FIG. 5C. If the received signal in horn B is greater than that in horn A, then the difference signal will be 180 degrees out of phase with the sum signal. Thus, the difference signal is either in phase, or 180 degrees out of phase with the sum signal, depending on whether the received signals originating below or above the crossover plane. Signals from a ground target located in the crossover plane produce equal signals in horns A and B, and thus the difference signal is zero.

As shown in FIGURE 4, the sum and difference R-F signals from the hybrid junction 1 are applied to the receiver-transmitter 20, in which they may be converted to I-F signals in crystal mixers. The amplitude and phase relationship between the sum and difference signals remains unchanged by this conversion since the same local oscillator is employed for both channel conversions. The sum and difference I-F signals are amplified in separate I-F amplifiers 4 and 5 and fed to the amplitude detector 6 and phase detector 10.

The sum pulse is then amplified and applied to the range computer circuit 7 as a positive video pulse. The sum and difference I-F signals are compared in phase detector 10. As shown in FIG. 5, at the phase detector 10 the difference I-F signal is 180 degrees out of phase with the sum I-F signal for R-F signals received from points above the crossover plane and in phase for R-F signals received from points below the crossover plane. The phase detector 7 produces a negative video output when the sum and difference I-F signals are 180 degrees out of phase (R-F signals received from points above the crossover plane) and a positive video output when they are in phase (R-F signals from points below the crossover plane). The pulse shape of the difference video output at the phase detector is the same as the envelope of the difference R-F signal. After amplification, the video pulse is applied to the range circuit 7.

The function of the range circuit 7 is to produce a voltage which is proportional to the distance from the antenna to the intersection of the crossover plane with the ground, that is, the slant range along the crossover plane. The details of range circuit 7 may be conventional and are outside the scope of this invention. The error signal output from phase detector 10 may be used to drive automatic tracking circuits.

Figure 6:
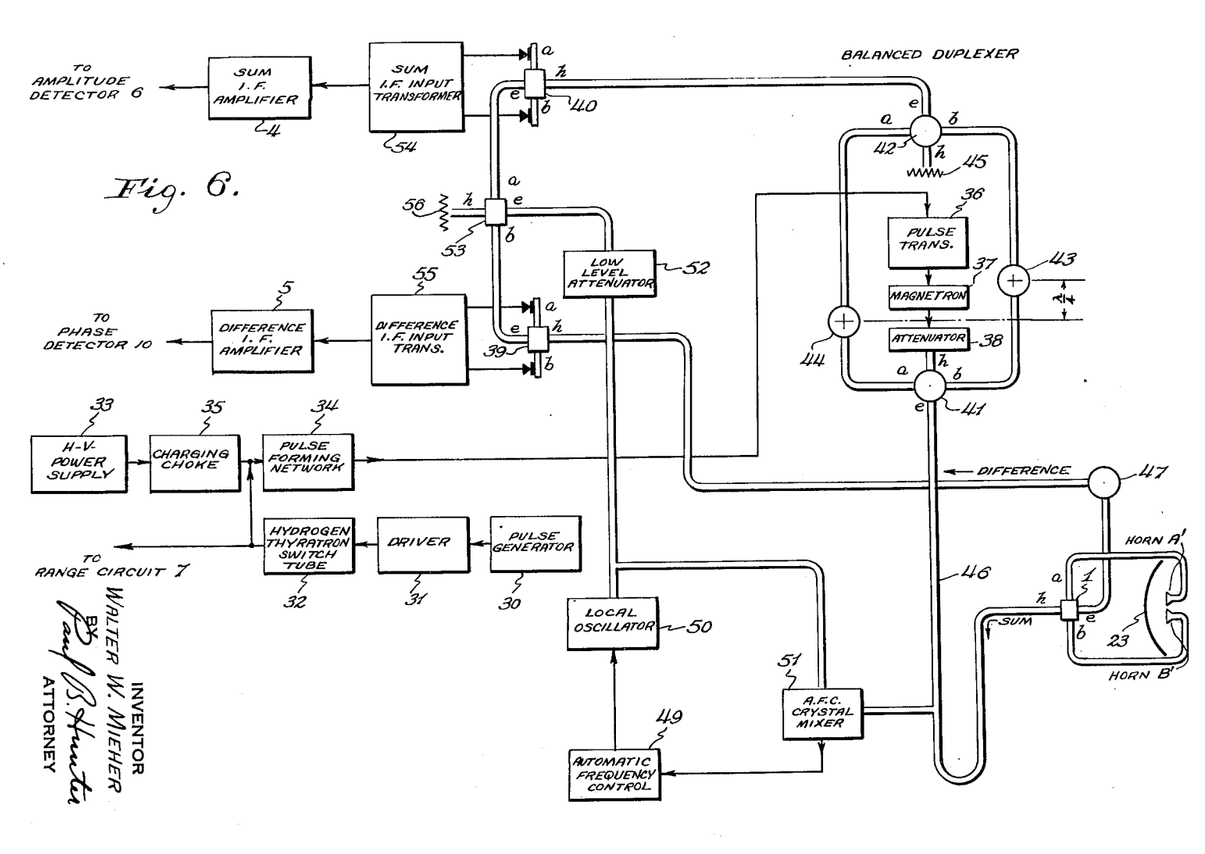
FIG. 6 is a schematic block diagram of an embodiment of the invention.

FIG. 6 shows an embodiment of the invention having more detail. The pulse generator 30 in the receiver-transmitter unit may contain a free-running blocking oscillator which produces a series of typical positive pulses having a width of 0.5 microsecond, a peak amplitude of approximately 100 volts, and a repetition rate of 4000 p.p.s. These triggers are applied to the driver circuit 31 which is conventional and may consist of a blocking oscillator and a cathode follower. The output of the driver 31 may be a 4000 p.p.s. series of positive pulses having a width of four microseconds and a peak amplitude of approximately 200 volts. These pulses are applied to the grid of a hydrogen thyratron switch tube 32 which is normally held below its firing potential by a suitable bias voltage.

The modulator may be a line-type pulser with D.-C. resonant charging. A conventional high-voltage power supply 33 charges a pulse-forming network 34 through a charging choke 35 to a voltage less than twice the voltage provided by the power supply. The inductance of the charging choke 35 and the capacitance of the pulse-forming network are preferably resonant at a frequency just below 2000 p.p.s. By the time that the network is charged to slightly less than twice the supply voltage, the positive pulse from the driver 31 causes the thyratron 32 to conduct and to discharge the pulse-forming network through the magnetron pulse transformer 36 in the receiver-transmitter unit. The output of the modulator circuits may be a negative voltage pulse having an amplitude of 1500 volts and a useful pulse width of 0.15 microsecond. The pulse is applied to the cathode of the magnetron 37 through the pulse transformer and produces a short R-F pulse.

*Microwave Transmission System*

The R-F output pulses from the magnetron 37 are waveguide coupled to a balanced duplexer which consists of two four-arm circular hybrid junctions 41 and 42 and two TR tubes 43 and 44. The power division and phasing properties of these junctions are identical with those of the rectangular hybrid junction or magic-tee, as shown in the above-mentioned Moreno article.

As shown in FIGURE 6, the output of the magnetron 37 is applied through an attenuator 38 to arm $h$ of circular hybrid junction 41. The attenuator 38 permits control of the radiated power, if such control is desired. The power applied to arm $h$ divides equally and flows into symmetrical arms $a$ and $b$ in phase, but due to the properties of the hybrid junction 41 no power is delivered to arm $e$. The energy flowing into symmetrical arms $a$ and $b$ causes the TR tubes 43 and 44 to fire and thus place a short circuit across each of these arms. In this way the magnetron output is prevented from entering the sum balanced crystal mixer 40 through circular hybrid junction 42 and causing damage to the crystals.

The electrical length of the waveguide between arm $b$ of junction 41 and its TR tube 43 is a quarter wavelength longer than the electrical length of the waveguide between arm $a$ of the junction and its TR tube. The short circuits placed across the waveguide by the firing of the TR tubes 43 and 44 cause the R-F energy traveling out arms $a$ and $b$ to be reflected back to junction 41. However, because the two-way path in arm $b$ is a half wavelength greater than the two-way path in arm $a$, the reflected wave in arm $b$ will arrive at the junction 180 degrees out of phase with the reflected wave in arm $a$. A characteristic of the hybrid junction involves the fact that when waves flow into arms $a$ and $b$ 180 degrees out of phase, all of the power in these arms is delivered to arm $e$ and none to arm $h$. The result is that the R-F output of the magnetron 37 is ultimately directed into arm $e$. The waves which leak past the TR tubes 43 and 44 and flow into arms $a$ and $b$ in junction 42 are in phase and are consequently delivered only to arm $h$ which contains a dissipative load 45. As a result, no leakage energy is coupled to the sum balanced crystal mixer 40 if the junction is correctly matched. The crystal mixers are coupled to their associated waveguides for instance by probes.

From the waveguide 46 the transmitter power is fed to shunt arm $h$ of a rectangular hybrid junction 1 located at the antenna unit. The input power is coupled equally into symmetrical arms $a$ and $b$. No power is coupled to series arm $e$. Since the waves flowing from the shunt arm $h$ of a hybrid junction to the two symmetrical arms ($a$ and $b$) are always in phase, and since the two waveguide sections between the hybrid junction and antenna feed horns are of equal electrical length, the output of the horns A' and B' are in phase.

The received radar signals picked up by the horns are in phase and consequently appear at the antenna hybrid junction 1 in phase whether the target is in the upper lobe, lower lobe, or in the crossover plane. However, as previously explained, the amplitude of the received signals at each horn depends on the origin of the reflected signal with respect to the crossover plane.

From shunt arm $h$ of the antenna hybrid junction 1, the sum of the two horn signals is passed back through the waveguide 46 to arm $e$ of circular hybrid junction 41. When a signal is applied to the series arm $e$ of a hybrid junction the output signal of the two symmetrical arms ($a$ and $b$) are 180 degrees out of phase and no power flows into the shunt arm ($h$). The received sum signals that flow through arms $a$ and $b$ are thus 180 degrees out of phase and, since the electrical lengths of the waveguide between the two circular hybrid junctions 41 and 42 are equal, the waves flowing into arms $a$ and $b$ of junction 42 are 180 degrees out of phase. Due to this phase relationship the power flows out of the junction 42 only through arm $e$, and then into shunt arm $h$ of the sum balanced crystal mixer 40. The received signal level is too low to cause the TR 43 and 44 tubes to fire.

The difference signal output from the antenna hybrid junction 1 at arm $e$ is applied to the $h$ arm of the difference balanced crystal mixer 39 through a TR tube 47. The TR tube 47 in the difference path provides protection for the difference crystal mixer 39 against any strong R-F signals from external sources which may accidentally be picked up by the horns.

The local oscillator 50 signal may be provided by a klystron which is tuned to 30 mc. above the magnetron frequency and maintained at this frequency by a conventional automatic frequency control 49 system in response to a signal from AFC crystal mixer 51. The local oscillator signal is applied to series arm $e$ of a rectangular hybrid junction 53 through an attenuator 52 which permits the power level of the signal to be controlled. The power applied to arm $e$ of junction 53 is coupled equally into symmetrical arms $a$ and $b$ and is 180 degrees out of phase in these arms. Arms $a$ and $b$ are connected to series arms $e$ of the sum balanced crystal mixer 40 and the difference balanced crystal mixer 39. Arm $h$ of junction 53 is terminated by load impedance 56.

Since the sum R-F signal is applied to shunt arm $h$ of the sum crystal mixer 40 the R-F signals in its symmetrical arms $a$ and $b$ are in phase with each other, but because the local oscillator signal is applied to series arm $e$, the local oscillator signals in arms $a$ and $b$ are 180 degrees out of phase with each other. Consequently the I-F signals produced by the mixing of the signals in the crystals are 180 degrees out of phase, whereas the local oscillator noise is in phase, and a balanced push-pull output may thereby be provided. Thus, the signal is passed and the local oscillator noise eliminated. In a like manner, the difference crystal mixer 39 produces a balanced I-F output, with greatly reduced local oscillator noise.

The balanced I-F outputs of the crystal mixers 39 and 40 are converted to single-ended outputs in the sum and the difference I-F input transformers 54 and 55 and applied to the I-F amplifiers 4 and 5 which may be tuned to 30 mc. The amplifiers are identical and may consist of a low noise input stage and several stages of conventional I-F amplification. The outputs of the amplifiers 4 and 5 are applied to the inputs of the amplitude detector 6 and phase detector 10 the functions of which have been explained.

FIGURE 7 is a schematic diagram of the phase detector 10. The difference I-F signal (marked D) is applied to the primary of transformer 60. This induces voltages in the secondary which are out of phase at the ends of the winding. The sum I-F voltage (marked S) is placed on the two branches of the phase detector through inductors 61 and 62. As shown by the single R-F cycle appearing at the top and bottom of coils 61 and 62, these voltages are in phase.

At the top of FIGURE 7 a typical difference I-F signal characteristic and sum I-F signal characteristic plotted against time are shown. The portion of the difference signal between $x$ and $y$ is due to reflected signals from the ground which is below the crossover plane; signals between $y$ and $z$ are due to ground reflections from above the crossover plane.

At any instant during the reception of the reflected signals from the ground above the crossover plane (interval between $y$ and $z$ of the difference I-F signal shown in FIGURE 7) the individual I-F cycles in the difference signal on the secondary of transformer 60 are 180 degrees out-of-phase with the corresponding I-F cycles in the sum signal. At the top and bottom of the secondary winding of transformer 60 in FIGURE 7 one of these out-of-phase I-F cycles is shown. For correct operation of the phase detector the amplitude of the sum I-F signal must always be greater than the difference I-F signal.

Consider now the operation of the phase detector for difference signals which are out of phase with the sum signal. Refer to the difference I-F cycles marked "out" and the sum I-F cycle marked "sum." In the upper branch of the detector the first half of the "out" I-F cycle and the first half of the "sum" I-F cycle add algebraically to produce a net negative half cycle at the plate of diode 63 with an amplitude equal to $(S-D)$. The upper diode 63 consequently will not conduct.

During the second halves of the "out" and "sum" I-F cycles on the upper branch a positive sine wave voltage proportional to $(S-D)$ is produced and the upper diode 63 conducts, charging condenser 65 to a voltage proportional to $(S-D)$.

On the lower branch of the detector the first halves of the "out" and "sum" I-F cycles add to produce a negative voltage proportional to $(S+D)$ which causes the lower diode 64 to conduct. However, in the second half of the cycle the two voltages add to produce a positive voltage proportional to $(S+D)$ which cuts off the lower diode. The negative voltage causes the lower diode to conduct and charge condenser 66 negatively with respect to ground at a voltage level proportional to $(S+D)$. After one complete I-F cycle the potential difference between points X and Y in FIGURE 7 is proportional to $$(S-D)+(S+D)$$

with point X positive with respect to ground and point Y negative with respect to ground. The output of the detector is taken from between resistors 67 and 68, and ground. Since the voltage across condenser 66 $(S+D)$, is greater than the voltage across condenser 65 $(S-D)$, the output voltage with respect to ground is negative and proportional to the difference I-F signal. Thus that portion of the difference I-F signal which is out of phase with the sum signal produces a negative video signal, as shown from y to z in waveform 69 at the output of the detector.

At point Y on the difference I-F input signal, the signal level is zero. Since the charges placed on the capacitors 65 and 66 by the sum signal are then equal, the output of the detector with respect to ground is zero, as shown at point Y on the output waveform.

In the interval between x and y on the difference I-F signal input, the I-F cycles are in phase with those in the sum I-F signal, cycle for cycle. Refer to the I-F cycles shown at the top and bottom of the secondary winding and marked "in" (in phase with the sum signal).

During the first half of the I-F cycle, the sum and difference voltages in the upper branch add and cause a negative voltage proportional to $(S+D)$ to cut off the diode 63. In the same half-cycle the negative voltage produced by the addition of the sum and difference voltages at the lower branch opens the lower diode 66 and charges condenser 66 to a negative voltage proportional to $(S-D)$ during this interval.

During the second half-cycle the addition of the voltages in the upper branch produces a positive voltage proportional to $(S+D)$, which opens the upper diode 63 and charges condenser 65 to a voltage proportional to $(S+D)$. The addition of the voltages in the lower branch produces a positive voltage which cuts off the lower diode 64. Since the voltage across condenser 65 is larger than that across condenser 66, the resulting output voltage is positive. Consequently, when the difference I-F signal is in the phase with the sum I-F signal, the output of the phase detector is positive as shown in the output waveform between x and y. The output of the detector is applied to range circuit 7.

The invention is not limited to use with radar systems but may be used in other ways. For instance, it may be used with radio beacons of the equi-signal type and wherever it is useful to simultaneously compare two signals in amplitude. Also the sum and difference data may be used for automatic angle tracking or supplied to a computer. Other phase detector arrangements may be used without departing from the scope of the invention.

What is claimed is:

1. In a radar system for accurately pointing at and ranging on a target, a pair of antennas having overlapping receptivity patterns, means connected to said antennas to obtain a sum reference voltage from the signals received by said antennas, means connected to said antennas to obtain a difference voltage between the signals received by said antennas and phase detector means connected to said sum and difference means to determine the phase difference between the sum and difference voltages.

2. In a simultaneous lobing radar system of the type having a plurality of overlapping lobes, a transmitter, a receiver responsive to reflections of said transmitted energy comprising; a local oscillator, a pair of mixers connected to said local oscillator, one mixer being adapted to be energized by the sum quantity of said lobe signals, the other mixer being adapted to be energized by the difference quantity between said lobe signals, and a phase detector connected to said mixers to determine the phase between said sum and differences quantities.

3. In a simultaneous lobing radar system of the type having a plurality of overlapping lobes, a transmitter, a receiver responsive to reflections of said transmitted energy comprising; a local oscillator, a pair of mixers connected to said local oscillator, one mixer being adapted to be energized by the sum quantity of said lobe signals the other mixer being adapted to be energized by the difference quantity between said lobe signals, and a phase detector connected to said mixers to determine the phase between said sum and difference quantities, an amplitude detector connected to the sum mixer and a ranging circuit responsive to said amplitude detector and said phase detector to measure target range in the midst of ground clutter.

4. In a simultaneous double lobing radar system, a transmitter, first and second antennas having receptivity patterns which overlap to define an axis of the system, means to combine the reflected signals received by said antennas, means to reverse the phase of the reflected signal received by one of said antennas and combine said phase reversed signal with the reflected signal received by the other of said antennas, and phase detector means to detect the phase of one of said combined signals with respect to the other, whereby the occurrence of the polarity reversal of said phase detector output is a measure of the range to the source of reflected signals along a line of sight coincident with said system axis.

5. In a simultaneous double lobing radar system, a transmitter, first and second antennas having receptivity patterns which overlap to define an axis of the system, means to combine first and second reflected signals received by said respective antennas so as to produce additively combined signals in response to signals received from one side of said axis of the system and subtractively combined signals in response to signals received from the other side of said axis, and phase detector means to detect the phase of one of said signals with respect to the other whereby the occurrence of the polarity reversal of said phase detector output is a measure of the range to the source of reflected signals along a line of sight coincident with said system axis.

6. In a multiple lobing radar system, a transmitter, a plurality of antennas grouped in pairs having receptivity patterns which overlap to define a radiation axis of the system, means to combine first and second reflected signals received by the first and second antennas of any pair so as to produce additively combined signals in response to signals received from one side of the axis defined by said pair of antennas and subtractively combined signals in response to signals received from the other side of said axis, and phase detector means to detect the phase of one of said combined signals with respect to the other whereby the occurrence of the polarity reversal of said phase detector output is a measure of the range to the source of reflected signals along a line of sight coincident with said system axis.

7. A system in accordance with claim 4 in which said phase detector comprises means to produce an output signal polarized in response to the phase of its input signals.

8. A system in accordance with claim 4 including means to position said antennas thereby to align the axis of said system with a desired line of sight.

9. A system in accordance with claim 7 including means to position said antennas in response to said polarized phase detector output signal, whereby the axis of said system is aligned with the source of said received signals.

10. In a simultaneous double lobing radar system, a transmitter, first and second antennas having receptivity patterns which overlap to define an axis of the system, hybrid junction means to combine the reflected signals received by said antennas and to reverse the phase of the reflected signal received by one of said antennas, and combine said phase reversed signal with the reflected signal received by the other of said antennas, an oscillator, means to mix said oscillator signal with each of said combined signals, and phase detector means to detect the phase of one of said mixed signals with respect to the other of said mixed signals, whereby the occurrence of the polarity reversal of said phase detector output is a measure of the range to the source of reflected signals along a line of sight coincident with said system axis.

11. A system in accordance with claim 10 which includes a generator for producing a positionable range gate, and means to cause said gate to lock on to said polarity reversal of said phase detector output.

12. In a simultaneous double lobing radar system, a transmitter, first and second antennas having receptivity patterns which overlap to define an axis of the system, wave guide means adapted to combine the reflected signals received by said antennas and to reverse the phase of the reflected signal received by one of said antennas and combine said phase reversed signal with the reflected signal received by the other of said antennas, an oscillator, means to mix said oscillator signal with each of said combined signals, means to amplify each of said mixed signals, and phase detector means to detect the phase of one of said amplified signals with respect to the other, whereby the occurrence of the polarity reversal of said phase detector output is a measure of the range to the source of reflected signals along a line of sight coincident with said system axis.

13. In a simultaneous lobing radar ranging system, at least two antennas having symmetrical overlapping receptivity patterns, means to discriminate against noise and improve angular accuracy comprising means to simultaneously compare the amplitude of signals received by said antennas including a hybrid junction wave guide arrangement having two input ends and two output ends, said input ends being connected to said antennas to obtain additive and subtractive combinations of said signals, and a phase detector connected to said output ends of said hybrid junction to compare said additive and subtractive combinations in phase to thereby obtain a comparison of said received signals.

14. In a radar system for air-to-ground ranging from an aircraft, a pair of antennas rigidly fixed to said aircraft and arranged to have receptivity patterns which overlap to define an axis of the system, hybrid junction means to combine the reflected signals received by said antennas so as to produce additively combined signals in response to reflected signals received from one side of said axis of said system and subtractively combined signals in response to reflected signals received from the other side of said axis, phase detector means to detect the phase of said combined signals with respect to each other, whereby the occurrence of the polarity reversal of the phase detector output is a measure of the range to the source of reflected signals along a line of sight coincident with said system axis, and a ranging circuit coupled to said phase detector means to measure the occurrence of said phase crossover.

References Cited in the file of this patent
UNITED STATES PATENTS

| | | |
|---|---|---|
| 2,445,896 | Tyrrell | July 27, 1948 |
| 2,456,666 | Agate | Dec. 21, 1948 |
| 2,467,361 | Blewett | Apr. 12, 1949 |
| 2,567,197 | Fox | Sept. 11, 1951 |
| 2,631,279 | Bollinger | Mar. 10, 1953 |